United States Patent
Dolle et al.

(10) Patent No.: US 6,458,190 B2
(45) Date of Patent: Oct. 1, 2002

(54) INSTALLATION AND PROCESS FOR THE SEPARATION OF GAS BY SELECTIVE PERMEATION

(75) Inventors: Pierre Olivier Dolle, Paris (FR); Christian Monereau, Paris (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 37 days.

(21) Appl. No.: 09/729,197

(22) Filed: Dec. 5, 2000

(30) Foreign Application Priority Data

Dec. 9, 1999 (FR) .............................. 99 15556

(51) Int. Cl.$^7$ .............................................. B01D 53/22
(52) U.S. Cl. ........................ 96/9; 95/15; 95/22; 95/45
(58) Field of Search ............................ 95/8, 12, 14, 15, 95/18, 19, 22, 23, 45, 47–56; 96/4, 7–10

(56) References Cited

U.S. PATENT DOCUMENTS

| | | | | |
|---|---|---|---|---|
| 2,626,679 A | * | 1/1953 | Harlow | 95/23 |
| 4,180,388 A | * | 12/1979 | Graham et al. | 95/55 |
| 4,397,661 A | | 8/1983 | King et al. | |
| 4,435,191 A | * | 3/1984 | Graham | 95/51 |
| 4,537,606 A | * | 8/1985 | Itoh et al. | 96/7 |
| 4,789,388 A | | 12/1988 | Nishibata et al. | |
| 4,806,132 A | * | 2/1989 | Campbell | 55/16 |
| 4,857,082 A | * | 8/1989 | DiMartino, Sr. et al. | 55/16 |
| 4,894,068 A | * | 1/1990 | Rice | 95/51 |
| 4,994,094 A | * | 2/1991 | Behling et al. | 95/50 X |
| 5,064,446 A | * | 11/1991 | Kusuki et al. | 95/53 |
| 5,249,428 A | * | 10/1993 | Barbe et al. | 95/45 X |
| 5,281,253 A | * | 1/1994 | Thompson | 95/22 |
| 5,282,969 A | * | 2/1994 | Xu | 95/45 X |
| 5,314,528 A | * | 5/1994 | Monereau | 95/55 |
| 5,344,480 A | * | 9/1994 | Schulte et al. | 95/52 |
| 5,378,263 A | * | 1/1995 | Prasad | 95/45 X |
| 5,425,801 A | * | 6/1995 | Prasad | 95/15 |
| 5,482,539 A | * | 1/1996 | Callahan | 95/51 |
| 5,507,855 A | * | 4/1996 | Barry | 95/22 X |
| 5,840,098 A | * | 11/1998 | Barbe et al. | 95/18 |
| 6,168,649 B1 | * | 1/2001 | Jensvold et al. | 95/51 X |

FOREIGN PATENT DOCUMENTS

| | | | | |
|---|---|---|---|---|
| EP | 0 346 566 | | 12/1989 | |
| FR | 0 075 431 | | 3/1983 | |
| JP | 63-123421 | * | 5/1988 | 96/7 |
| JP | 02-131112 | * | 5/1990 | 96/7 |
| JP | 04-180812 | * | 6/1992 | 95/51 |

* cited by examiner

Primary Examiner—Robert H. Spitzer
(74) Attorney, Agent, or Firm—Young & Thompson

(57) ABSTRACT

This installation comprises subgroups of permeators (SG1 to SG3), each subgroup comprising a permeator (4A to 4C) or several permeators mounted in parallel, and having an inlet (12A to 12C), a permeate outlet (14A to 14C) and a non-permeate outlet (16A to 16C). The non-permeate outlet of a first subgroup (SG1, SG2) is connected to the inlet of a second subgroup (SG2, SG3), and at least one of the subgroups has closure elements (22A to 22C) for its permeate outlet when the real feed flow rate is below the nominal feed flow rate by a predetermined quantity.

8 Claims, 1 Drawing Sheet

INSTALLATION AND PROCESS FOR THE SEPARATION OF GAS BY SELECTIVE PERMEATION

FIELD OF THE INVENTION

The present invention relates to an installation for treating of a feed gaseous mixture by selective permeation, of the type adapted to be supplied with a nominal feed flow rate of the gaseous mixture, and comprising at least two subgroups of permeators, each subgroup comprising one or several permeators mounted in parallel, and having at least one inlet, a permeate outlet, and a non-permeate outlet.

It relates moreover to a process for treating a gaseous mixture using such an installation.

BACKGROUND OF THE INVENTION

Installations for the separation of a gaseous mixture by selective permeation comprise permeators which comprise a receptacle in which is arranged a membrane having selective permeability, separating a non-permeate chamber and a permeate chamber.

The receptacle comprises a feed opening, a non-permeate outlet opening and a permeate outlet opening. Supplementally, certain permeators comprise a fourth opening which permits the introduction of a so-called sweeping gas into the permeate circuit. The presence of this opening is however not pertinent to the present invention.

So as to separate a gaseous mixture, the permeator is fed with a stream of the mixture by opening the supply. There is then produced a pressure difference between the two sides of the membrane.

Given that the membrane has a greater permeability for one constituent of the mixture than for another constituent of the mixture, the permeate is enriched in the more permeable constituent whilst the other constituent remains essentially on the non-permeate side.

The two gas flows are then withdrawn from the respective outlet openings.

The permeability of the membrane for a given constituent of the gaseous mixture depends on different parameters, among others: the temperature of the feed gas flow, the pressure of this gas flow, the pressure of the gas on the permeate side and the difference between these two pressures.

This is why the installations are designed for a predetermined flow rate of feed gas, at a certain pressure and at a certain temperature, and for a certain pressure on the permeate side. At this point of use, the installation separates a certain proportion of constituent to be separated from the mixture, called productivity or recovery, at a certain purity.

Very often, for reasons of production, the separation installations are not used at their predetermined use point, the demand for production gas (either the permeate, or the non-permeate) being below the nominal gas flow rate.

In such cases, if the feed flow rate is simply decreased, corresponding to a decrease in demand, it is noted that the productivity increases whilst the purity of the recovered product decreases.

So as to impart a certain flexibility to installations as to feed flow rate, whilst keeping the productivity and the purity constant, numerous proposals have been made.

In the first instance, one could modify the operative conditions of the membrane. This could be done by acting on the operating pressures on the feed side and/or the permeate side, for example by reduction of the pressure difference between the two sides of the membrane or by reduction of the pressure on the feed side, or else by changing the temperature of the gas (see for example U.S. Pat. Nos. 4,806,132, 4,857,082, 5,840,098).

The modification of the use conditions of the permeators is however very limited if it is desired to maintain acceptable performance.

In the second place, the surface of the permeation used could be decreased.

As to this, it has been proposed to install n(n>2) permeators in parallel which are each supplied with a portion of the feed flow. When the gas demand decreases, the number of permeators is decreased as function of blocking the permeate outlet of a corresponding number of permeators, as described for example in U.S. Pat. No. 4,397,661. Each permeator is then traversed by its nominal flow rate, but the permeation takes place only in a portion of the permeators.

In this installation, the feed flow rate remains unchanged during operation under decreased requirement for production. The productivity is correspondingly reduced.

SUMMARY OF THE INVENTION

The invention has for its object to provide an installation for the separation of a gaseous mixture by selective permeation, which permits an operation below the nominal feed flow rate whilst keeping a productivity and a purity similar to those at nominal operation, and which permits rapid return to nominal conditions.

To this end, the invention has for its object an installation for treating a gaseous mixture by selective permeation, of the type mentioned above, in which the non-permeate outlet of a first subgroup is connected to the inlet of a second subgroup, and at least one of the first and second subgroups comprises means for at least substantially selectively closing its permeate outlet.

According to particular embodiments, the invention can comprise one or several of the following characteristics:

the connections of the non-permeate outlet of a subgroup to the inlet of a following subgroup are free from any closure means;

each of the subgroups has a same permeation surface;

each of the subgroups, except one subgroup, particularly the upstream subgroup, comprises means for at least substantially closing the permeate side;

the permeation surface is different from one subgroup to the other;

the subgroups are interconnected such that each subgroup has a permeation surface greater than or equal to that of the following subgroup;

each of the subgroups comprises means for at least substantially closing its permeate outlet;

the closure means are all or nothing valves;

the installation comprises means for adjusting the temperature of the feed fluid and/or means for adjusting the pressure of the feed fluid and/or means for adjusting the pressure of the permeate.

The invention also has for its object a process for treating a gaseous mixture using an installation as defined above, characterized in that said closure means of at least one subgroup are at least substantially closed when the real feed flow becomes less than the nominal feed flow rate by a predetermined quantity.

According to the invention, the process can comprise one or several of the following characteristics:

- when the closure means are closed, the ratio of the effective permeation surface to the total permeation surface of the installation is substantially equal to the ratio of the real feed flow rate to the nominal feed flow rate;
- when an equalization of the ratio of the permeation surfaces to the ratio of the flow rates by said closing is not possible, opening means are actuated such that the ratio of the permeation surfaces will be as close as possible to the ratio of the permeation surfaces during said equalization, and greater than this value;
- when the ratio of the effective permeation surface to the total permeation surface is not equal to the ratio of the real feed flow rate to the nominal feed flow rate, the temperature of the feed fluid and or/the pressure of the feed fluid and or the pressure of the permeate are adjusted such that the permeate has a predetermined flow rate and purity;
- all the non-permeate flow of a subgroup is the supply flow of the following subgroup.

BRIEF DESCRIPTION OF THE DRAWINGS

The invention will be better understood from a reading of the description which follows, given solely by way of example and with respect to the accompanying drawings, in which.

DESCRIPTION OF THE PREFERRED EMBODIMENTS

Figure 1:
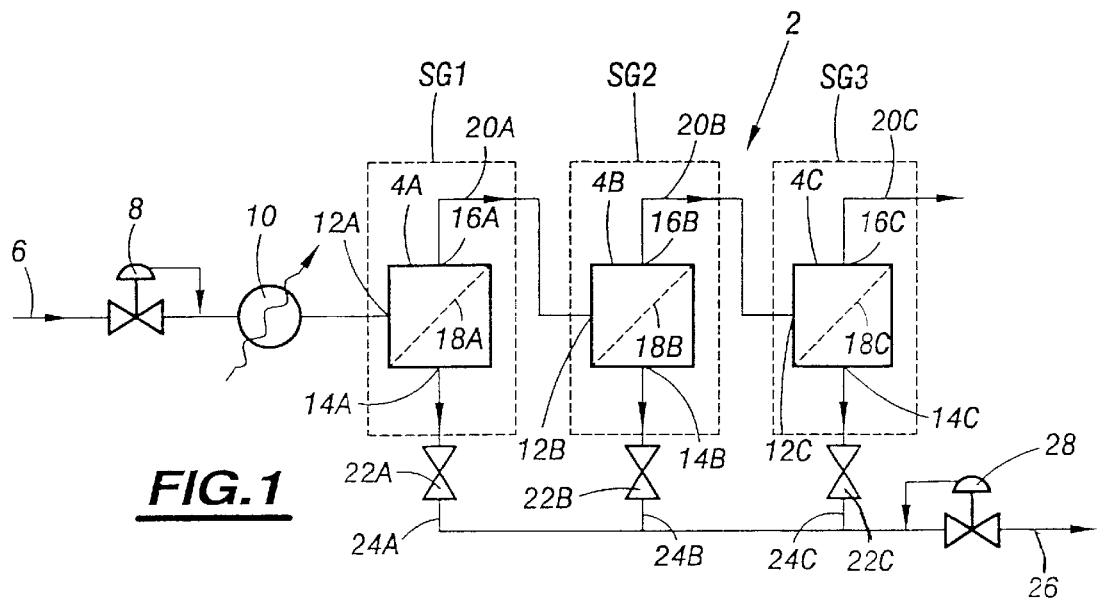
FIG. 1 shows schematically a gas separation installation according to a first embodiment of the invention.

FIG. 1 shows an embodiment of an installation 2 for treating a feed gaseous mixture by selective permeation. It comprises three subgroups SG1, SG2, SG3 of which each comprises an identical permeator 4A, 4B, 4C.

A supply conduit 6 is connected by means of an adjustment valve 8 and a heat exchanger 10, to the inlet of the first 4A of the three permeators 4A, 4B, 4C.

Each permeator 4A, 4B, 4C has an inlet 12A, 12B, 12C, a permeate outlet 14A, 14B, 14C and a non-permeate outlet 16A, 16B, 16C. Each permeator 4A, 4B, 4C comprises a permeation membrane 18A, 18B, 18C which has a certain surface which has a selective permeability for different constituents of the feed mixture and which separates a high pressure chamber (non-permeate) from a low pressure chamber (permeate). The three permeators 4A, 4B, 4C are connected in series on the non-permeate side, which is to say that the non-permeate outlet 16A, 16B of a permeator other than the last permeator 4C is connected to the inlet 12B, 12C of the following permeator by conduits 20A, 20B. It is to be noted that the conduit 20A, 20B leading from the outlet 16A, 16B of one permeator to the inlet 12B, 12C of a following permeator comprises no closure means.

A closure valve 22A, 22B, 22C is inserted in the non-permeate outlet conduit 24A, 24B, 24C of each permeator. The closure valves 22A, 22B, 22C act as closure means on the permeate side. They are, for example, all-or-nothing valves.

The outlet conduits 24A, 24B, 24C are connected to a production collecting conduit 26, leading, in this embodiment, to a user circuit.

An adjustment valve 28 is inserted in each production conduit 26. It serves to regulate the pressure on the permeate side.

It is to be noted that the permeators 4A, 4B, 4C and the membranes 18A, 18B, 18C are selected as a function of the gaseous mixture to be separated. Any permeator/membrane permitting separating the gaseous mixture to be treated, can be used. The membrane comprises for example hollow fibers or spirally wound sheets.

The installation operates in the following manner.

During normal operation, the nominal flow rate of a feed stream of a gaseous mixture is introduced into the first permeator 4A by the supply conduit 6. The stream comprises a high permeability constituent and a low permeability constituent. This stream is adjusted to a certain pressure by the adjustment valve 8, and it is given a predetermined temperature by the heat exchanger 10. For this nominal mode of operation, the three closure valves 22A, 22B, 22C are open.

The stream enters the first permeator 4A, namely into the high pressure chamber of the latter. Because of the pressure difference prevailing on the two sides of the membrane 18A, the gaseous mixture is then forced to pass through the membrane 18A. Thanks to the selective permeability of the membrane 18A, the high permeability constituent passes through the membrane much more rapidly than the other constituent. This is why, on the low pressure side, the permeate is enriched in high permeability constituent. This gaseous stream leaves the permeator 4A by the permeate outlet 14A.

During the dwell time of the mixture in the high pressure chamber of the permeator 4A, only a portion of the high permeability constituent passes through the membrane 18A.

Most of the low permeability constituent of the gaseous mixture, as well as a portion of the high permeability constituent which is not passed through the membrane 18A, leaves the first permeator 4A through the non-permeate outlet 16A. This gaseous stream enters the second permeator 4B by the inlet 12B of the latter. Here again, a certain quantity of the high permeability constituent passes through the membrane 18B toward the low pressure chamber, and the permeate is withdrawn at the permeate outlet 14B, as was the case for the first permeator 4A. Again, the residual gaseous mixture leaves the permeator 4B by the non-permeate outlet 16B and is sent to the inlet 12C of the third permeator 4C. In the third permeator 4C, substantially the rest of the high permeability constituent is separated from the feed stream and withdrawn with the permeate.

The fact that the permeators 4A, 4B, 4C are connected in series from the feed side has little effect on the operating pressures of the permeators, because the feed stream generally has a high pressure.

The permeate gas is sent from the outlets 14A, 14B, 14C of the three permeators 4A, 4B, 4C, through closure valves 22A, 22B, 22C, to the collecting conduit 26, from which it passes to the user. The adjustment valve 28 located in the collecting conduit permits adjusting the pressure in the low pressure chambers of the permeators 4A, 4B, 4C and, as a result, the pressure gradient relative to the high pressure chambers.

The gaseous constituent of the low permeability as well as the residue of the high permeability constituent, is removed at the outlet 16C of the third permeator 4C, through the conduit 20C.

It is to be noted that the product it is desired to obtain by the user can equally well be the non-permeate, for example during production of nitrogen from air, instead of the permeate, for example during the purification of hydrogen.

When the user's gas requirement falls, for example to ⅔ of the nominal production capacity of the installation 2, the closure valve 22A, 22B, 22C of one of the permeators 4A, 4B, 4C is closed and the feed flow rate of the gaseous mixture decreases to ⅔ of the nominal flow rate.

In this case, the pressure adjusted by the two adjusting valves 8, 28, as well as the temperature adjusted by the heat exchanger 10, remain the same as during operation at nominal flow rate of the installation 2.

For example, the closure valve 22C of the third permeator 4C is closed. As a result of this closure, the pressure in the low pressure chamber (permeate side) of the third permeator 4C adjusts to the pressure of the high pressure chamber of the latter. The permeation in the third permeator 4C thus stops. The effective membrane surface, which is to say the sum of the permeation surfaces of the subgroups whose closure valves are open, is thus ⅔ of the effective membrane surface during nominal operation, which is to say with total permeation surface. The ratio of the feed flow rate of the gaseous mixture to the effective permeation surface thus remains constant, and the conditions in the first permeator 4A and the second permeator 4B remain the same as before.

This is why at the permeate outlet 14A, 14B of these two permeators 4A, 4B, there is recovered a gaseous stream of permeate having substantially the same purity as the permeate stream during nominal operation. ⅔ of the nominal flow rate of this permeate gas can thus be withdrawn, via the collecting conduit 26, by the user. The residual gas stream which is present at the non-permeate outlet 16B of the second permeator 4B is sent to the inlet 12C of the third permeator 4C, passes through it without any permeation taking place, and leaves from the non-permeate outlet 16C of the third permeator 4C.

It will be seen that a reduction of the temperature of the third permeator 4C is thus prevented. The membrane of the third permeator is thus not in danger of damage by condensation of the constituents of the gaseous mixture. According to the gaseous mixture to be treated, such condensates could be, for example, water, alcohols, aromatics, $NH_3$, amines or heavy hydrocarbons. According to the type of membrane, the various negative effects could appear, namely:

modification of the diffusional properties. For example the swelling of the polymer;

destruction of the chemical structure;

deposit of a layer on the surface modifying the gaseous flow.

The installation can immediately again be used at nominal flow rate, without reheating of the third permeator 4C being necessary.

When the user's gas requirement falls to ⅓ of the nominal flow rate, the closure valve 22B of the second permeator 4B is also closed, and the feed flow rate is correspondingly decreased.

The effects which take place in the permeators are the same as in the case of ⅔ of nominal flow rate mentioned above. The separation of gas takes place only in the first permeator, under initial conditions. The purity of the permeate thus remains unchanged, and the two inactive permeators remain at the service temperature ready to be put back into operation.

When the gas requirement is between the points of use ⅓ and ⅔ or between ⅔ and 100% of the nominal flow rate of the installation, the feed flow rate is adjusted to the value which corresponds to this requirement, the closure valves 22A, 22B, 22C are adjusted such that the ratio of the effective permeation surface to the total permeation surface of all the permeators would be as near as possible to the ratio of the real feed flow rate to the nominal flow rate, and preferably greater than this value, and feed pressure is modified, the temperature of the feed stream is modified, the pressure of the permeate is modified and/or the difference between the high and low pressures is modified, in a conventional manner.

In this way, the desired purity of the product can be maintained substantially independently of the gas flow rate required.

As a modification, only a portion of the permeators 4A, 4B, 4C has closure valves on their outlet side, particularly all the permeators except one. In this case, it is preferable, because of the (low) successive pressure loss from one permeator to the other, to arrange the permeators having closure valves downstream of the permeators without valves.

So as to make use of the graduation of the nominal flow rates, only N−1 closure valves are necessary for an installation of N subgroups. This leads to a low construction and control cost.

Figure 2:
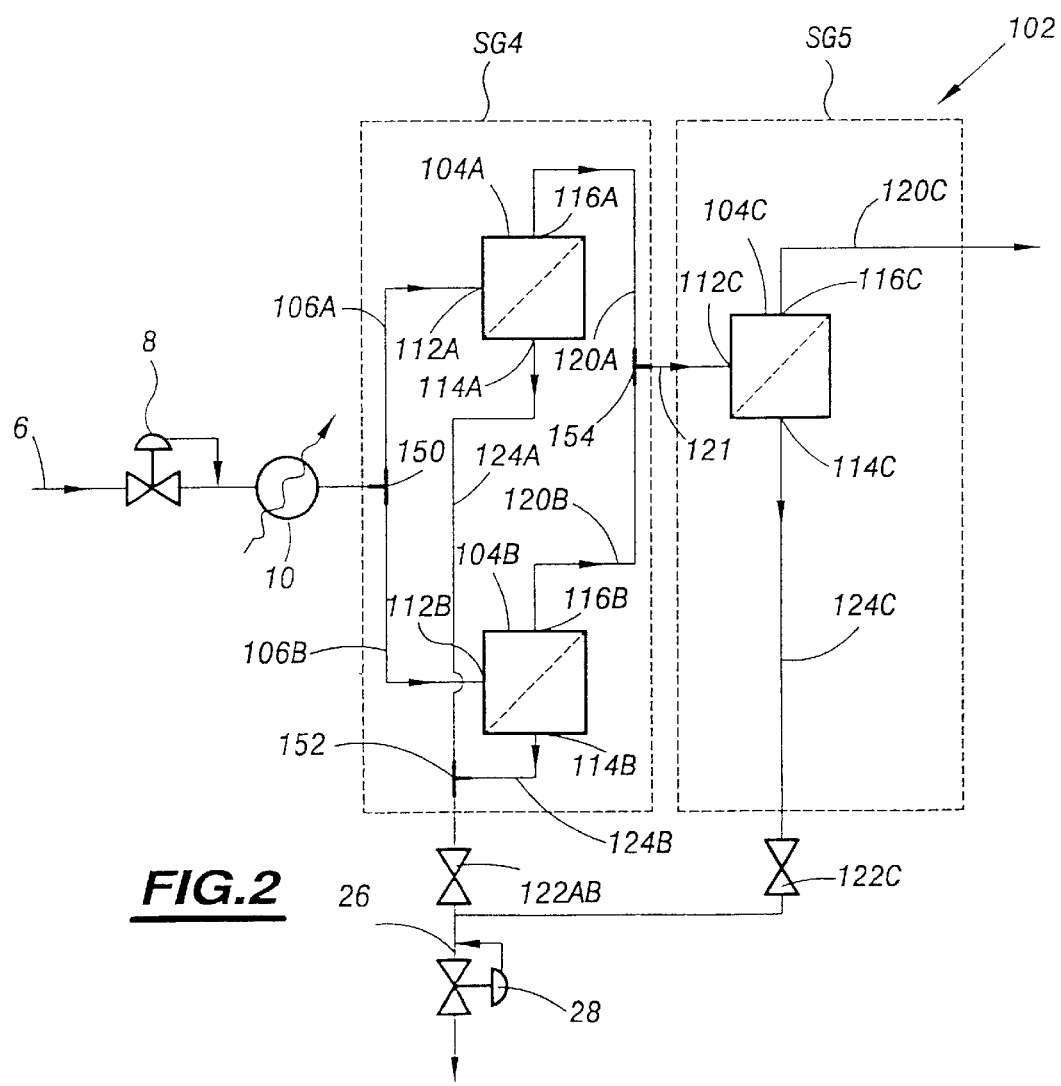
FIG. 2 shows a second embodiment of a gas separation installation according to the invention.

In FIG. 2, there is seen a different embodiment of the installation according to the invention.

Elements identical to those of FIG. 1 are designated by the same reference numerals. Elements having a function analogous to those of FIG. 1 have the reference numerals of the elements of this figure, increased by 100.

This installation 102 comprises two subgroups of permeators SG4, SG5, of which the first, SG4, comprises two identical permeators 104A, 104B mounted in parallel, and a second subgroup SG5 comprises a third permeator 104C.

The supply conduit 6 is connected by means of the pressure adjusting valve 8 and the heat exchanger 10 to a T connector 150. Two conduits 106A, 106B lead from this T shaped connector 150, in parallel, to the inlets 112A, 112B of the two permeators 104A, 104B. The permeate outlets 114A, 114B of the two permeators 104A, 104B are connected by permeate conduits 124A, 124B and by a T shaped connector 152 to a closure valve 122AB.

The non-permeate outlets 116A, 116B of the two permeators 104A, 104B are connected, by means of outlet conduits 120A, 120B, to a T shaped connector 154 to which is connected a non-permeate collecting conduit 121. This collecting conduit 121 leads to the inlet 112C of the third permeator 104C. The permeate outlet 114C of the third permeator 104C is connected by means of a permeate conduit 124C via a closure valve 122C, to the permeate collecting conduit 26 coming from the outlet of the closure valve 122AB. The non-permeate outlet 116C of the third permeator is connected to the non-permeate outlet conduit 120C.

The collecting conduit 26, leading to the user, includes the valve 28 for adjusting the pressure of the permeate.

The two identical permeators 104A, 104B connected in parallel, forming the subgroup of permeators SG4, could be replaced by a single permeator having a permeation surface equal to the sum of the permeation surfaces of the two permeators 104A, 104B.

The installation 102 operates in the following manner.

In normal operation, the installation is supplied with a nominal feed flow rate of gaseous mixture. The two closure valves 122AB, 122C are open in this case. The feed stream passes through the adjusting valve 8 and the heat exchanger 10. At the T shaped connector 150, it is divided into two halves. Each half of the feed stream passes through one of the two permeators 104A, 104B of the subgroup SG4, where a certain quantity of the high permeability gas is separated from the low permeability gas, the permeate being then sent via the collecting conduit 26 through the outlet conduits 124A, 124B.

The non-permeate gas from each of the two permeators 104A, 104B leaves the permeator at the non-permeate outlet 116A, 116B, passes through outlet conduits 120A, 120B, and is reunited in the T shaped connector 154 and enters the third permeator 104C, where another portion of the high permeability gas is withdrawn and passes through the permeate conduit 124C, through the closure valve 122C and to the collecting conduit 26. The residual gas leaves via the non-permeate conduit 120C of the third permeator.

When the gas requirement falls to ⅔ of the nominal flow rate, the flow rate of the feed stream is reduced to ⅔ of nominal flow and, simultaneously, the closure valve 122C of the third permeator 104C is closed. Again, the ratio of the effective membrane surface to the feed gas flow rate remains unchanged. As a result, the productivity and the purity of the gas withdrawn at the outlet of the permeate are substantially constant.

If the permeate gas requirement falls to ⅓ of the nominal flow rate, the gaseous feed stream flow rate is reduced to ⅓, and, simultaneously, the closure valve 122AB is closed of the two permeators 104A, 104B and the closure valve 122C of the third permeator 104C is opened.

The feed stream then passes through the two permeators 104A, 104B, without any separation taking place and enters the third permeator 104C, where the gaseous constituents are separated.

Here again, the ratio of the effective membrane surface to the feed flow rate remains unchanged.

When the flow rate required by the user is between ⅓ and ⅔ or between ⅔ and 100% of the nominal production flow rate, the valves are switched and the parameters of pressure and/or temperature are acted on as for the first embodiment. This installation requires only one closure valve per subgroup. This leads to a low cost of production and control.

The two embodiments illustrated are given only by way of example. The number of subgroups with identical permeation surface of an installation or the ratios of the permeation surfaces of the subgroups of permeators of an installation can differ.

It is to be noted that each subgroup can be constituted by a single permeator or by several permeators in parallel, of which the latter can be identical or different.

In the case in which an installation comprises subgroups SG4, SG5 having different permeation surfaces, it is preferable to connect the subgroups SG4, SG5 to each other such that each subgroup SG4 has a greater permeation surface than that of the following subgroup SG5 or is equal to the latter.

In particular, in the case in which an installation comprises identical permeators grouped in subgroups SG4, SG5, it is preferable to connect the subgroups such that the upstream subgroup SG4 comprises more permeators mounted in parallel than the downstream subgroup SG5.

Thus, the (low) influence of pressure drop from one subgroup to the following is further decreased.

It will be noted that, in all cases, all the permeators are always traversed by the feed stream, and thus a cooling of the latter giving rise to danger of condensation, is avoided.

The resetting of the permeators is immediately possible when the requirement again increases, without heating means being necessary.

As a modification, instead of all-or-nothing valves which can be closed only completely, the closure valves 22A to 22C or 122AB, 122C can be adjustable valves that are not quite totally closed so as to let pass a small flow rate of permeate gas. There is thus obtained a better distribution of temperature in the unused permeators.

It is to be noted that the invention is applicable also to installations comprising permeators having membranes of different characteristics from one permeator to the other. The disclosure of the invention is thus consequently modified.

What is claimed is:

1. An apparatus for the treatment by selective permeation of a gaseous mixture to be supplied at a nominal feed flow rate, comprising in series at least an upstream permeator unit and a downstream permeator unit, each permeator unit comprising at least one permeator having a gas inlet, a permeate outlet and a non-permeate outlet, the non-permeate outlet of the upstream permeator unit being permanently connected to the gas inlet of the downstream permeator unit; and each permeate outlet being connected to a permeate collector via a shut-off valve.

2. The apparatus of claim 1, wherein the permeator units have a same permeation surface.

3. The apparatus of claim 1, wherein each of said shut-off valves is an all-or-nothing valve.

4. The apparatus of claim 1, wherein the shut-off valve of at least one permeator unit is closed when the feed flow rate is reduced by a predetermined quantity relative to the nominal feed flow rate.

5. The apparatus of claim 1, wherein the permeator units have different permeation surfaces.

6. The apparatus of claim 5, wherein at least one permeator unit includes at least two permeators mounted in parallel.

7. The apparatus of claim 1, wherein the permeate collector includes pressure control means.

8. The apparatus of claim 7, further comprising temperature control means for controlling the temperature of the gaseous mixture.

* * * * *